United States Patent
Wiedmeyer (10) Patent No.: US 8,708,880 B2
(45) Date of Patent: Apr. 29, 2014

(54) THREE-LAYERED CONTAINERS AND METHODS OF MAKING THE SAME

(75) Inventor: Warren G. Wiedmeyer, Slinger, WI (US)

(73) Assignee: Pactiv LLC, Lake Forest, IL (US)

(*) Notice: Subject to any disclaimer, the term of this patent is extended or adjusted under 35 U.S.C. 154(b) by 1490 days.

(21) Appl. No.: 11/985,102

(22) Filed: Nov. 14, 2007

(65) Prior Publication Data

US 2008/0121681 A1 May 29, 2008

Related U.S. Application Data

(60) Provisional application No. 60/859,265, filed on Nov. 15, 2006.

(51) Int. Cl.
- *B65D 3/22* (2006.01)
- *B65D 81/38* (2006.01)
- *B32B 1/02* (2006.01)
- *B31B 7/00* (2006.01)

(52) U.S. Cl.
USPC .................. 493/56; 229/403; 220/592.2

(58) Field of Classification Search
USPC ......... 229/403, 103.11; 493/56, 84, 906, 907, 493/89, 93, 95, 110, 210; 220/592.26; 206/433
See application file for complete search history.

(56) References Cited

U.S. PATENT DOCUMENTS

| | | |
|---|---|---|
| 2,266,828 A | 12/1941 | Sykes |
| 2,853,222 A | 9/1958 | Gallagher |
| 3,106,327 A | 10/1963 | Karl |
| RE25,618 E | 7/1964 | Goodman |
| 3,372,830 A | 3/1968 | Edwards |
| 4,040,537 A | 8/1977 | Edwards |
| 4,618,066 A | 10/1986 | Vail |
| 4,993,580 A | 2/1991 | Smith |
| 5,092,485 A | 3/1992 | Lee |
| 5,145,107 A | 9/1992 | Silver et al. |
| 5,226,585 A | 7/1993 | Varano |
| 5,326,019 A | 7/1994 | Wolff |
| 5,363,982 A | 11/1994 | Sadlier |
| 5,385,260 A | 1/1995 | Gatcomb |
| 5,415,339 A | 5/1995 | Howard |
| 5,460,323 A | 10/1995 | Titus |
| 5,524,817 A | 6/1996 | Meier et al. |
| 5,542,599 A | 8/1996 | Sobol |
| 5,547,124 A | 8/1996 | Mueller |
| 5,628,453 A | 5/1997 | MacLaughlin |
| 5,660,326 A | 8/1997 | Varano et al. |
| 5,685,480 A | 11/1997 | Choi |
| 5,697,550 A | 12/1997 | Varano et al. |
| 5,713,512 A | 2/1998 | Barrett |
| 5,725,916 A * | 3/1998 | Ishii et al. .................. 428/34.2 |
| 5,752,653 A | 5/1998 | Razzaghi |

(Continued)

FOREIGN PATENT DOCUMENTS

JP 07223683 A * 8/1995

*Primary Examiner* — Gary Elkins
*Assistant Examiner* — Christopher Demeree
(74) *Attorney, Agent, or Firm* — Nixon Peabody LLP (57) ABSTRACT

A thermally insulated container is disclosed. The container comprises an inner layer having a bottom portion with a bottom closure attached to the bottom portion. The container further comprises an outer layer wrapped around the inner layer. The container further comprises an insulating middle layer sandwiched between the inner layer and the outer layer. The middle layer has at least one aperture formed therein.

13 Claims, 6 Drawing Sheets

(56) References Cited

U.S. PATENT DOCUMENTS

| | | |
|---|---|---|
| RE35,830 E | 6/1998 | Sadlier |
| 5,769,311 A | 6/1998 | Morita et al. |
| 5,772,111 A | 6/1998 | Kirsch |
| 5,775,577 A | 7/1998 | Titus |
| 5,839,653 A | 11/1998 | Zadrafetz |
| 5,964,400 A | 10/1999 | Varano et al. |
| 6,085,970 A | 7/2000 | Sadlier |
| 6,109,518 A | 8/2000 | Mueller et al. |
| 6,116,503 A | 9/2000 | Varano |
| 6,126,584 A | 10/2000 | Zadrafetz |
| 6,142,331 A | 11/2000 | Breining et al. |
| 6,186,394 B1 | 2/2001 | Dees et al. |
| 6,193,098 B1 | 2/2001 | Mochizuki et al. |
| 6,196,454 B1 | 3/2001 | Sadlier |
| 6,224,954 B1 | 5/2001 | Mitchell et al. |
| 6,253,995 B1 | 7/2001 | Blok et al. |
| 6,257,485 B1 | 7/2001 | Sadlier et al. |
| 6,260,756 B1 | 7/2001 | Mochizuki et al. |
| 6,286,754 B1 * | 9/2001 | Stier et al. ............ 229/403 |
| 6,364,149 B1 | 4/2002 | Smith |
| 6,378,766 B2 | 4/2002 | Sadlier |
| 6,536,657 B2 | 3/2003 | Van Handel |
| 6,729,534 B2 | 5/2004 | Van Handel |
| 6,926,197 B2 | 8/2005 | Hed et al. |

\* cited by examiner

Fig. 4d

THREE-LAYERED CONTAINERS AND METHODS OF MAKING THE SAME

CROSS-REFERENCE TO RELATED APPLICATIONS

This application claims the benefit of U.S. Provisional Application No. 60/859,265, filed Nov. 15, 2006, which is hereby incorporated by reference in its entirety.

FIELD OF THE INVENTION

The present invention relates generally to disposable containers and, more particularly, to insulated disposable containers and/or cups, and methods of manufacturing the same.

BACKGROUND OF THE INVENTION

Some types of disposable cups that are typically used for holding beverages include those comprised of polystyrene, expanded polystyrene, and paper. Although polystyrene cups are aesthetically pleasing, they provide little, if any, insulation and are, therefore, mainly used for holding cold drinks. Condensation may form on the outside of a polystyrene cup containing a cold drink, thereby making the cup wet, cold, and/or uncomfortable to use and/or hold for prolonged periods of time. The condensation may also make the polystyrene cup slippery, thus making the cup even more difficult and/or uncomfortable to hold. Another drawback of polystyrene cups is that they are environmentally unfriendly because they are neither biodegradable nor easily recyclable.

A second type of cup, comprised of expanded polystyrene, or EPS (e.g., a Styrofoam® cup), is an excellent thermal insulator and may, thus, maintain the temperature of a drink—whether hot or cold—for extended periods of time. Expanded polystyrene cups are generally inexpensive and comfortable to handle because their exteriors stay close to ambient temperature regardless of the temperature of the beverage inside the cup. One drawback of expanded polystyrene cups, however, is that they are environmentally unfriendly because expanded polystyrene is neither biodegradable nor easily recyclable. As a result, the use of expanded polystyrene cups has been banned in some municipalities. Additionally, because the expanded polystyrene cups must be printed after they have been formed and their rough surface does not allow high-resolution printing, a slow and costly process must be used for printing on expanded polystyrene cups.

Standard, single-wall paper cups are generally recyclable and biodegradable and are, therefore, considered environmentally sound. However, paper cups are relatively poor thermal insulators, and, thus, a beverage in a paper cup quickly warms (if cold) or cools (if hot). Paper cups are also generally uncomfortable to handle because a hot or cold drink may uncomfortably cool or heat a hand. Additionally, as with polystyrene cups, a cold drink may cause condensation to appear on the outside of the paper cup, making the cup slippery and/or difficult to hold. Furthermore, the single-wall construction of paper cups makes them particularly fragile, and, thus, paper cups filled with liquid may crumble after prolonged handling.

Multi-layered paper cups have been designed to provide thermal insulation and increased strength, which are often lacking in single-layered paper cups. Multi-layered cups generally comprise several layers including an outer layer, a middle insulating layer, and an inner layer. Although generally strong and thermally efficient, multi-layered cups may be impractical and expensive to manufacture. For example, because multi-layered cups may require three times more material to manufacture than single-layered cups, the cost of materials required to manufacture a multi-layered cup may be expensive.

It would be desirable to provide a multi-layered container or cup that assists in addressing one or more of the above disadvantages.

SUMMARY OF THE INVENTION

According to one embodiment of the present invention, a thermally insulated container is disclosed. The container comprises an inner layer having a bottom portion with a bottom closure attached to the bottom portion. The container further comprises an outer layer wrapped around the inner layer. The container further comprises an insulating middle layer sandwiched between the inner layer and the outer layer. The middle layer has at least one aperture formed therein.

According to one process of the present invention, a method of making a thermally insulated container is disclosed. The method comprises the act of providing a bottom blank, an inner layer blank, and an outer layer blank. The method further comprises providing a sheet adapted to be used as a middle layer blank. The method further comprises dividing the sheet into at least a first middle layer blank and a second middle layer blank. At least one of the first middle layer blank and the second middle layer blank has an aperture formed thereon. The method further comprises stacking the inner layer blank, the outer layer blank, and the first middle layer blank such that the first middle layer blank is sandwiched between the inner layer blank and the outer layer blank to form a layered arrangement. The method further comprises wrapping the layered arrangement. The method further comprises sealing opposing ends of the layered arrangement.

According to another process of the present invention, a method of making a thermally insulated container is disclosed. The method comprises the act of providing a sheet suitable for use as a middle layer. The sheet comprises an insulating sheet material. The method further comprises dividing the sheet into at least a first middle layer and a second middle layer. At least one of the first middle layer and the second middle layer includes an aperture being formed therein. The method further comprises forming a first container. The first container includes the first middle layer being sandwiched between a first inner layer and a first outer layer. The method further comprises forming a second container. The second container includes the second middle layer being sandwiched between a second inner layer and a second outer layer.

The above summary of the present invention is not intended to represent each embodiment or every aspect of the present invention. Additional features and benefits of the present invention are apparent from the detailed description and figures set forth below.

BRIEF DESCRIPTION OF THE DRAWINGS

FIG. 3b is a top view of a middle layer blank formed from the sheet of FIG. 3a.

FIG. 3c is a top view of another middle layer blank formed from the sheet of FIG. 3a.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention.

DESCRIPTION OF ILLUSTRATED EMBODIMENTS

Figure 1A:
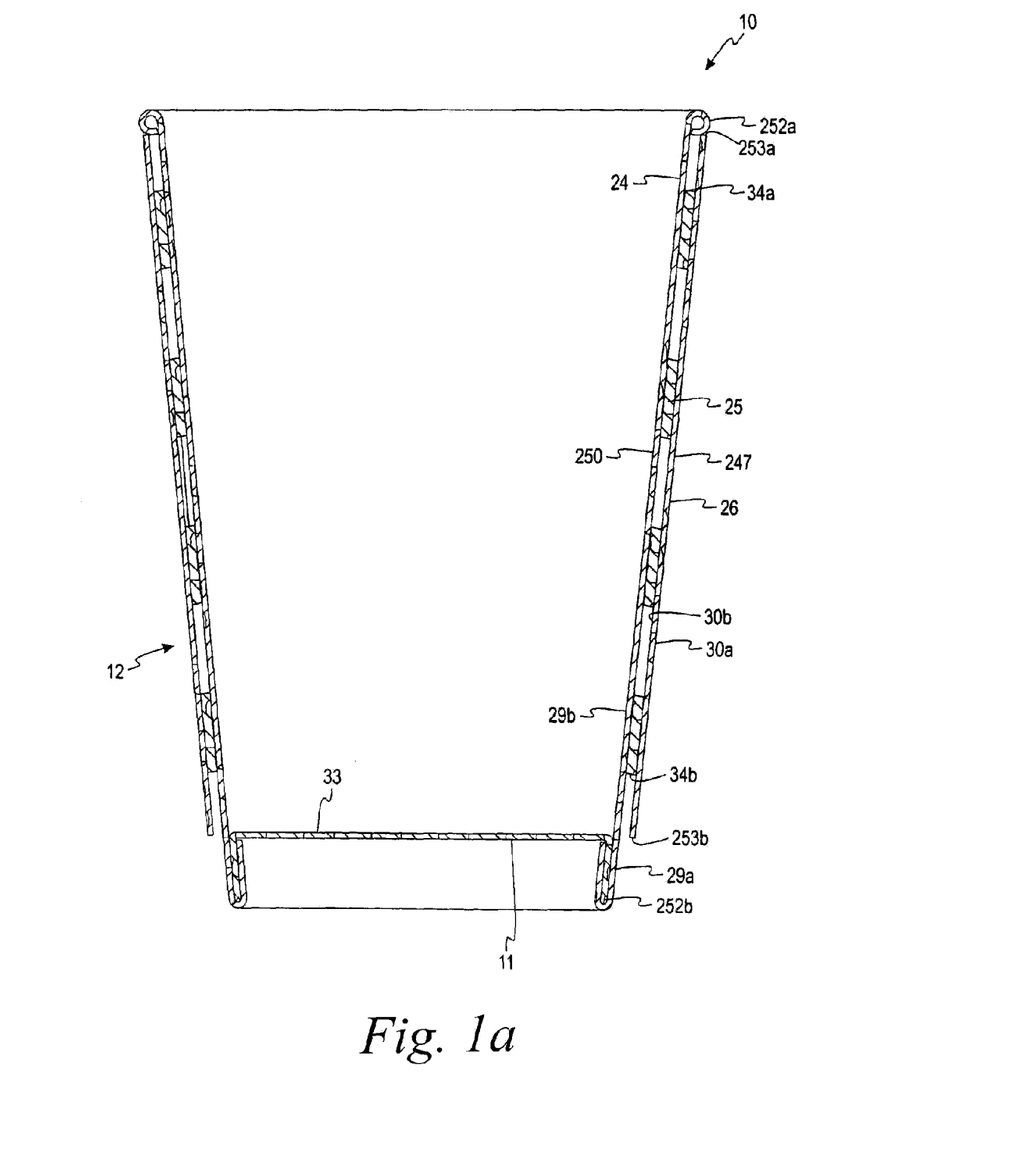
FIG. 1a is a cross-sectional, side view of a cup made according to one embodiment of the present invention.
Figure 2A:
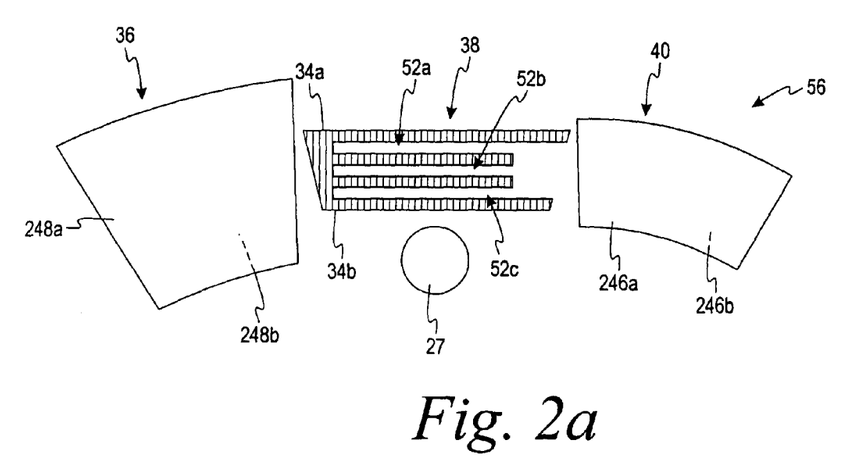
FIG. 2a is a top view of blanks used for making the cup of FIG. 1a in accordance with an embodiment of the present invention.

Referring to FIG. 1a, a cup 10 is shown in accordance with one embodiment of the present invention. The cup 10 includes a bottom 11 and a sidewall 12. The sidewall 12 comprises an inner layer 24, an insulating middle layer 25, and an outer layer 26. The bottom 11 is formed from a bottom blank 27, as shown in FIG. 2a.

The inner layer 24 may comprise various types of suitable materials. Non-limiting examples of materials that may be used to form the inner layer 24 include, flat, unscored paperboard such as chipboard (plain chip or bending chip), linerboard, virgin paperboard, paperboard with recycled content, solid bleach sulfite (SBS) board, solid unbleached sulfite (SUS) board, polymeric solid sheets, combinations thereof, or the like. The inner layer 24 may further be comprised of foil or metalized film laminated paperboard, porous sheets, foam sheets (e.g., expanded polystyrene), combinations thereof, or the like. Although the thickness of the inner layer 24 generally depends on the type and/or application of the resulting cup 10, the thickness of the inner layer 24 is generally from about 1 mil to about 20 mils. More typically, the thickness of the inner layer 24 is generally from about 5 mils to about 10 mils. It is contemplated that the inner layer 24 may also have other thicknesses.

Alternatively or additionally, a front side 29a, a back side 29b, or both the front side 29a and the back side 29b of the inner layer 24 may be coated with a waterproof material including, for example, plastic. It may be desirable for the back side 29b of the inner layer 24 to include the waterproof material to assist in preventing or inhibiting a liquid held inside of the cup 10 from seeping into or through the sidewall 12. One non-limiting example of such a waterproof material is polyethylene (low, medium, or high density), which may serve as both an adhesive and a waterproof coating. Furthermore, a polyethylene coating generally provides a printable surface. Although the embodiments of the present invention are generally described herein as having a polyethylene coating, it is contemplated that other suitable coatings may also be used with any of the embodiments of the present invention. For example, other types of waterproof and heat sealable coatings that may be used include, but are not limited to, polypropylene, foamed polyethylene, other foamed polymers, polyester, polyolefins, other types of biodegradable, recyclable, waterproof and/or heat sealable coatings, combinations thereof, or the like. The thickness of the waterproof coating is generally from about 0.5 mil to about 1.5 mils. It is contemplated that the waterproof coating may also have other thicknesses. The coating may have a matte finish, a gloss finish, or an intermediate, semi-gloss type finish. Any suitable method of applying the coating may be used including, but not limited to, press applying the waterproof coating. It is contemplated that the inner layer 24 may comprise two-sided polyethylene sheets such that the inside of the cup 10 is waterproofed and provides the outside of the cup 10 with a coated printable surface on the front side 29a.

Similarly, the outer layer 26 may comprise various types of suitable materials. Non-limiting examples of materials that may be used to form the outer layer 26 include unscored paperboard such as chipboard (plain chip or bending chip), linerboard, virgin paperboard, paperboard with recycled content, SBS board, SUS board, polymeric solid sheets, combinations thereof, or the like. The outer layer 26 may further be comprised of foil or metalized film laminated paperboard, porous sheets, foam sheets (e.g., expanded polystyrene), combinations thereof, or the like. Alternatively or additionally, a front side 30a, a back side 30b, or both the front side 30a and the back side 30b of the outer layer 26 may be coated with a waterproof coating including, for example, polyethylene. Although the thickness of the outer layer 26 generally depends on the type and/or application of the resulting cup 10, the thickness of the outer layer 26 is generally from about 1 mil to about 20 mils. More typically, the thickness of the outer layer 26 is generally from about 5 mils to about 10 mils. It is contemplated that the outer layer 26 may also have other thicknesses. Although not shown in the illustrated embodiments, the outer layer 26 may include ribs, an array of dimples, corrugations, scores, combinations thereof, or the like to increase insulation and/or to provide an enhanced surface for gripping.

The insulating middle layer 25 may comprise any suitable material. For example, the insulating middle layer 25 may comprise flat, unscored paperboard such as chipboard (plain chip or bending chip), linerboard, virgin paperboard, paperboard with recycled content, SBS board, SUS board, polymeric sheets, combinations thereof, or the like. The middle layer 25 may further be comprised of scored foil or metalized film laminated paperboard, porous sheets, foam sheets (e.g., expanded polystyrene), fluted paperboard sheet, a water-soluble (e.g., starch-based) material, a paperboard sheet with a foamed heat-insulating layer coating (e.g., polyethylene, polyolefin, polyvinylchloride, polystyrene, polyester, or nylon), combinations thereof, or the like. The thickness of the middle layer 25 is generally from about 2 mils to about 15 mils. More typically, the thickness of the middle layer 25 is generally from about 5 mils to about 10 mils. It is contemplated that the middle layer 25 may also have other thicknesses.

Figure 1B:
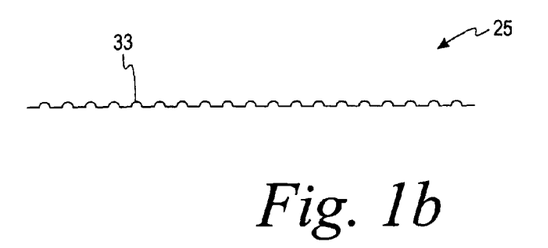
FIG. 1b is a side view of a middle layer blank according to one embodiment.

The middle layer 25 generally includes spaced grooves, scores, or corrugations 33, as shown in FIG. 1b, formed into its surface. The corrugations 33 provide air space within the sidewall 12 of the cup 10. The corrugations 33 of the illustrated embodiments extend substantially from a top edge 34a to a bottom edge 34b of the middle layer 25. The corrugations 33 may be positioned from about 115 mils to about 515 mils apart and may range from about 5 mils to about 30 mils deep. It is contemplated that the corrugations 33 may be positioned other distances apart and/or may have various other depths. The corrugations 33 may be formed by any suitable die operation(s). In one embodiment, the corrugations 33 are formed into a sheet while cutting the sheet from a larger starting sheet.

The corrugations 33 may also be formed prior to or after cutting the sheet. In an alternative embodiment, instead of corrugations running from top to bottom, the corrugations are positioned to run sideways (i.e., from left to right), diagonally, or the like. Furthermore, instead of corrugations 33, it is contemplated that embossed dimples or any other type of integral deformities may be formed into the sheet.

Referring back to FIG. 1a, the bottom 11 of the cup 10 may comprise various types of suitable materials. Non-limiting examples of materials that may be used to form the bottom 11 include unscored paperboard such as chipboard (plain chip or bending chip), linerboard, virgin paperboard, paperboard with recycled content, SBS board, SUS board, polymeric solid sheets, combinations thereof, or the like. The bottom 11 may further be comprised of foil or metalized film laminated paperboard, porous sheets, foam sheets (e.g., expanded polystyrene), combinations thereof, or the like. The thickness of the bottom 11 is generally from about 1 mil to about 20 mils. More typically, the thickness of the bottom 11 is generally from about 5 mils to about 15 mils. It is contemplated that the bottom 11 may also have other thicknesses. It is further contemplated that the bottom 11 may be coated on at least an inner surface 33 with a waterproof material including those described above with respect to the inner layer 24.

Each of the inner layer 24, the middle layer 25, and the outer layer 26 is formed from a corresponding inner layer blank 36, middle layer blank 38, and outer layer blank 40, as shown in FIG. 2a. Each of the blanks 36, 38, 40 may be die cut from a separate, corresponding larger sheet or roll (not shown) of paper or other suitable sheet material.

The inner layer blank 36 and the outer layer blank 40 are generally tapered to form the corresponding inner layer 24 and outer layer 26 of the sidewall 12 of the cup 10. Although the middle layer blank 38 of the illustrated embodiments is also tapered, tapering the middle layer lank 38 is not necessary, particularly in embodiments where the middle layer blank 38 is corrugated and may, therefore, be stretched. In general, when making straight-walled containers using techniques of the present invention, the sidewall blanks 36, 38, 40 are generally straight rather than tapered as in FIG. 2a.

Figure 2B:
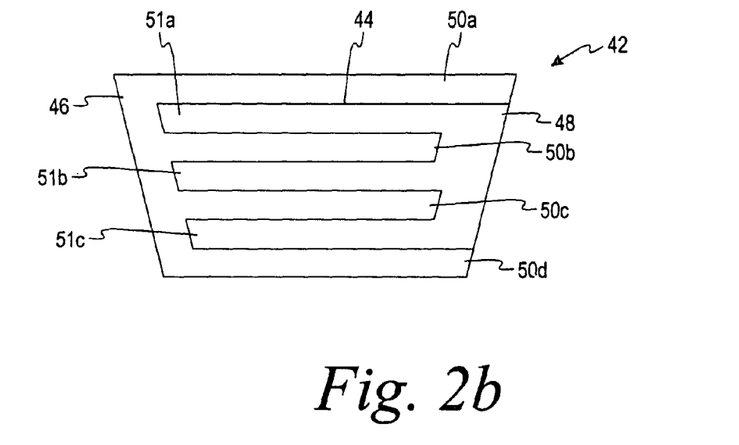
FIG. 2b is a top view of a sheet used to form middle layer blanks according to one embodiment of the present invention.

According to embodiments of the present invention, the middle layer blank 38 is formed from a sheet (e.g., sheet 42 of FIG. 2b). The dimensions of the sheet are such that the sheet itself is suitable for use as a middle layer blank. The sheet is divided into more than one portion, each of which includes one or more apertures. The aperture may include any type of opening, hole, gap, space, slot, slit, or the like. Thus, the aperture may be enclosed on less than all of its sides. Each of the portions may be used as a middle layer blank (e.g., middle layer blank 38) in a multi-layered container (e.g., cup 10). Because at least two middle layer blanks are made from a single sheet, the amount of material used is reduced. Thus, the cost associated with manufacturing multi-layered cups according to the embodiments of the present invention is lower than the cost associated with typical manufacturing methods.

FIG. 2b illustrates the sheet 42 according to one embodiment of the present invention. The sheet 42 has characteristics and dimensions suitable for use as a middle layer blank for forming a multi-layered container. The sheet 42 is divided along cut lines 44 to form a first portion 46 and a second portion 48. In the embodiment of FIG. 2b, the first portion 46 includes four bands 50a-d. The first portion 46 further includes three corresponding apertures, or slits (e.g., slits 52a-c of FIG. 2a) positioned between each of the bands 50a-d. The second portion 48 includes three bands 51a-c corresponding with the three slits 52a-c of the first portion 46.

Figure 2C:
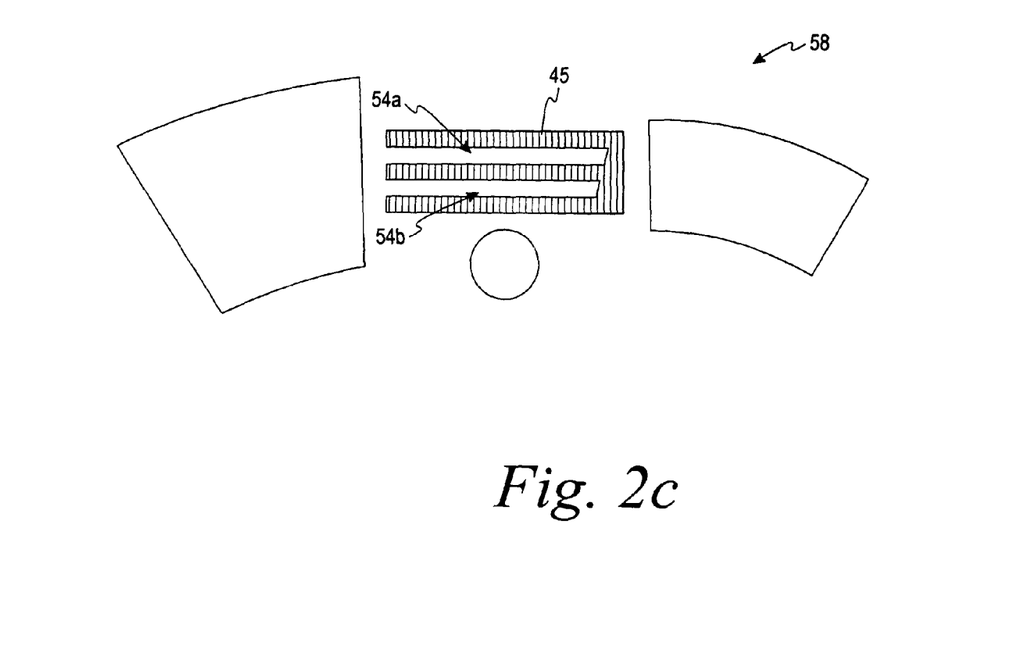
FIG. 2c is a top view of blanks used for making a cup in accordance with another embodiment of the present invention.

The second portion 48 further includes two slits (e.g., slits 54a,b of FIG. 2c) corresponding with the second and third bands 50b,c of the first portion 46. It is contemplated that the first portion 46 and/or the second portion 48 may have any number of bands, other shapes, or the like.

Each of the first portion 46 and the second portion 48 may be used in forming the middle layers of respective cups or containers. For example, the first portion 46 may be used as a first middle layer blank 38 in a first cup assembly 56 (see FIG. 2a), and the second portion 48 may be used as a second middle layer blank 45 in a second cup assembly 58 (see FIG. 2c).

The sheet 42 may be divided along the cut lines 44 using any suitable method. Furthermore, although in the illustrated embodiments, the sheets are divided into two middle layer blanks, it is contemplated that more than two middle layer blanks may be formed from a single sheet.

Although significantly less material (about half of the typical amount or less) is used in forming the middle layer blanks of the embodiments of the present invention, the level of insulation of the resulting cup (e.g., cup 10) is not substantially decreased. Furthermore, the area of the sidewall 12 of the cup 10 that is insulated by each of the middle layer blanks is generally the same or similar to the area of the sidewall 12 that would be insulated using the full sheet. Referring to FIG. 2a, for example, when the blanks 36, 38, 40 are assembled to form the cup 10 of FIG. 1a, the sidewall 12 of the cup 10 includes air spaces within the slits (e.g., slits 52a-c of FIG. 2a) previously occupied by the bands 51a-c of the second portion 48 (see FIG. 2b). These air spaces sufficiently insulate the corresponding areas of the sidewall 12. Thus, the area of the cup 10 that is insulated remains generally the same as if the entire sheet 42 was used to form the middle layer of the cup 10.

Figure 3A:
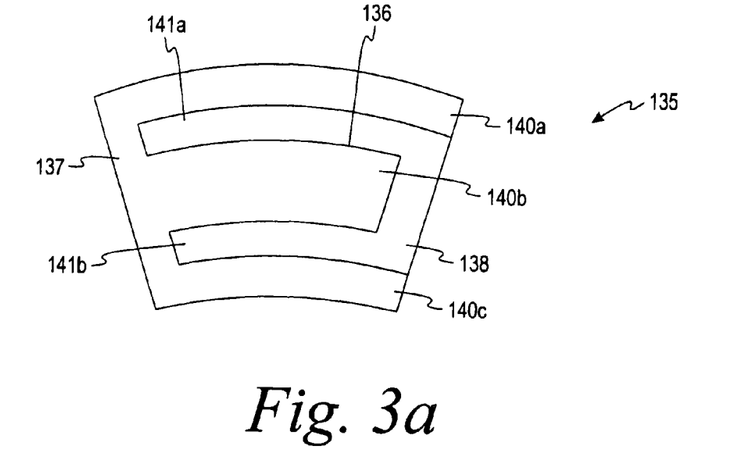
FIG. 3a is a top view of a sheet used to form middle layer blanks according to another embodiment of the present invention.
Figure 3B:
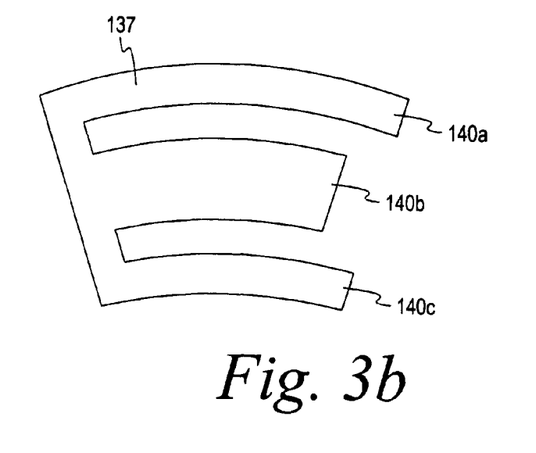
Figure 3C:
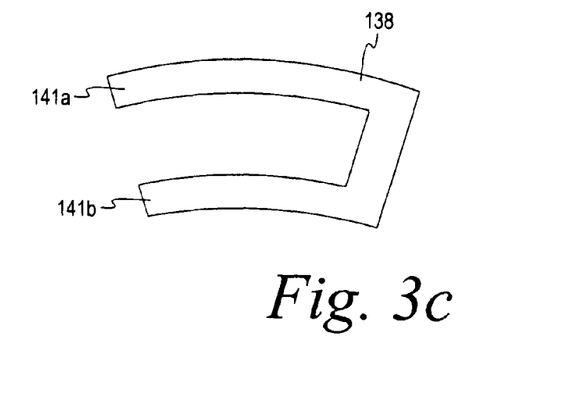

The sheets (e.g., sheet 42) of the embodiments of the present invention may be divided such that the first portion 46 and the second portion 48 have any suitable shape. For example, FIG. 3a shows a sheet 135 according to another embodiment of the present invention. The sheet 135 has cut lines 136 that divide the sheet 135 into a first portion 137 and a second portion 138. The first portion 137 includes three bands 140a-c (see FIG. 3b), and the second portion 138 includes two bands 141a-b (see FIG. 3c). Each of the first portion 137 and the second portion 138 may be used as a middle layer blank in a respective container or cup, thereby reducing the amount of material and the costs associated with forming the containers or cups.

Figure 4A:
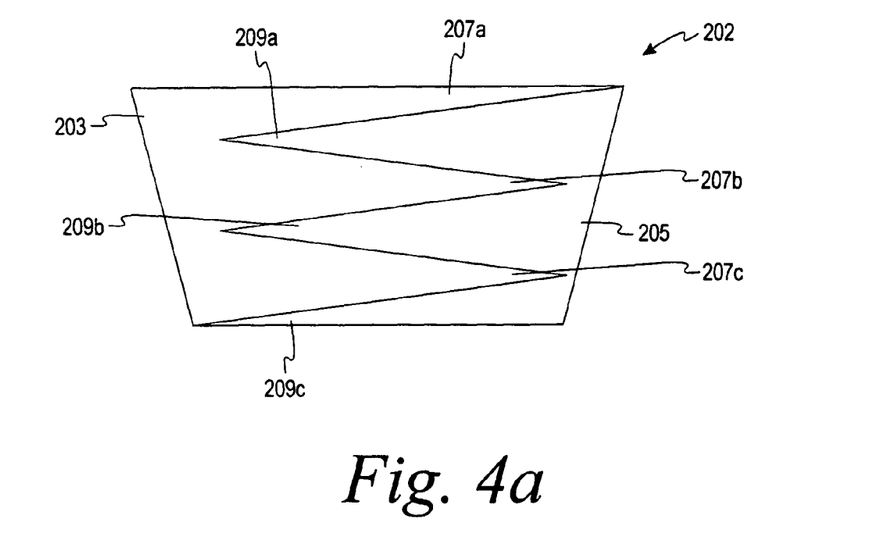
FIGS. 4a-d are top views of sheets used to form middle layer blanks according to other embodiments of the present invention.
Figure 4B:
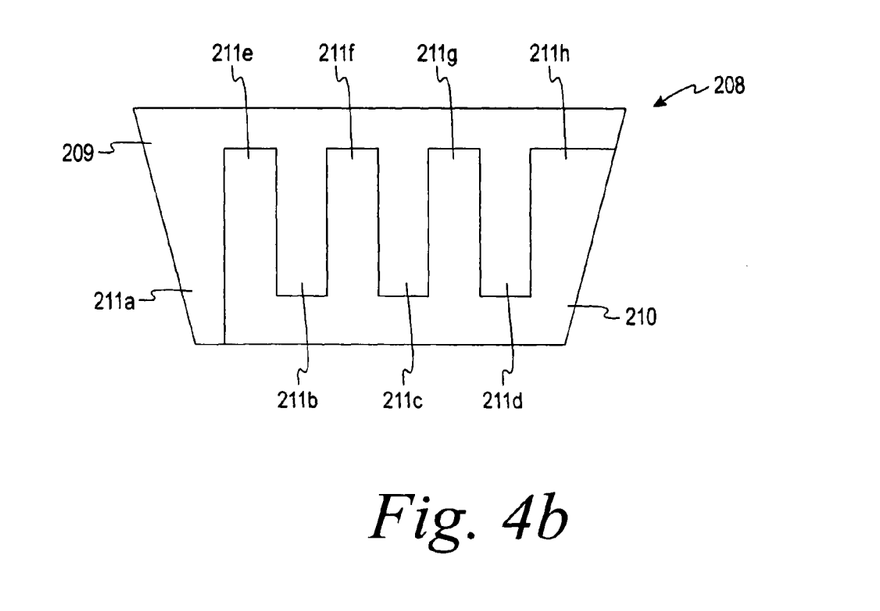
Figure 4C:
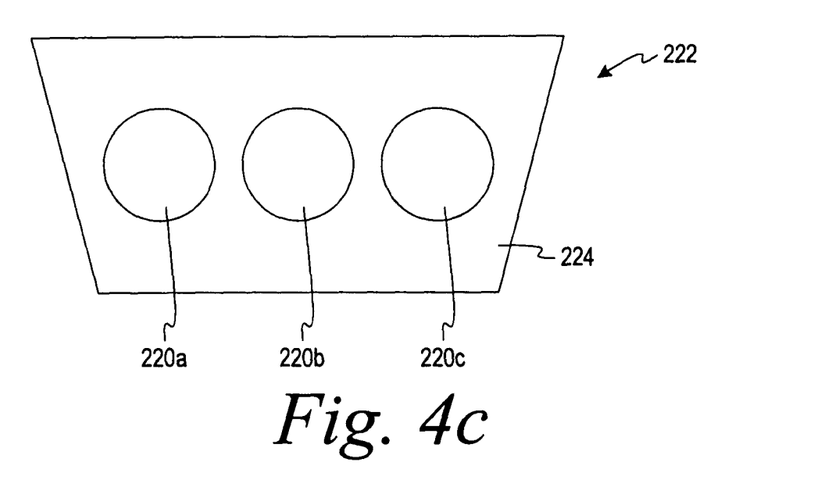

Other non-limiting examples of ways in which a sheet may be divided into multiple portions for use as middle layer blanks are shown in FIGS. 4a-c. A sheet 202 of FIG. 4a, for example, may be cut to form a first portion 203 and a second portion 205, each of which has three pointed bands 207a-c and 209a-c, respectively. The first portion 203 may be used as a first middle layer blank, and the second portion 205 may be used as a second middle layer blank.

FIG. 4b illustrates a sheet 208 being divided into a first portion 209 and a second portion 210. Each of the first portion 209 and the second portion 210 includes four respective bands 211a-h. In contrast to the bands 50a-d, 51a-c of FIG. 2b and the bands 140a-c, 140a,b of FIGS. 3a-c, the bands 211a-h of FIG. 4b are generally vertical. It is contemplated that portions having any number of bands with any suitable orientation(s) may be formed.

The sheets of the embodiments of the present invention may also be divided into shapes other than bands. In FIG. 4c, for example, a plurality of generally round shapes 220a-c are cut from a sheet 222. Thus, the apertures of FIG. 4c include holes extending completely through the sheet 222. A resulting main portion 224 may be used as a middle layer blank in a first cup. The plurality of shapes 220a-c may be used as a middle layer blank(s) in another cup(s). Although in the illustrated embodiment, three generally round shapes have been cut from the sheet 222, other shapes, amounts of shapes, combinations thereof, or the like may also be used.

Figure 4D:
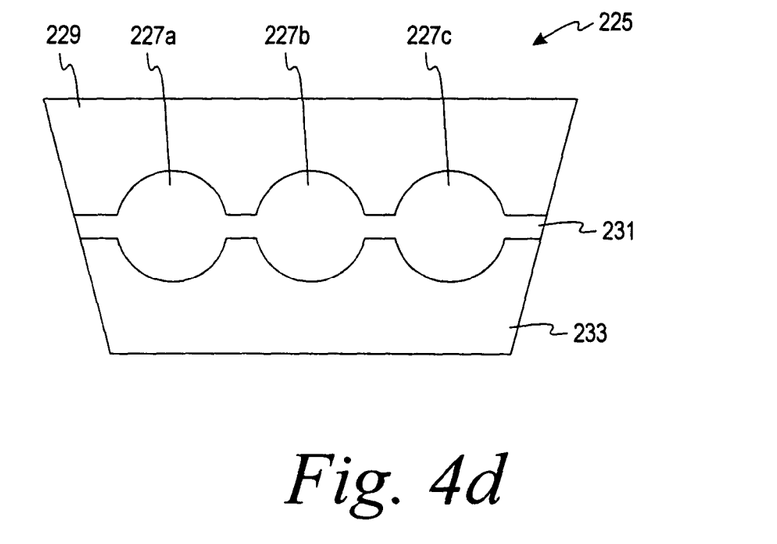

The sheet 225 of the embodiment of FIG. 4d is similar to the sheet of 222 of FIG. 4c. However, the sheet 225 includes a plurality of shapes 227a-c that are connected. Thus, the sheet 225 is divided into three portions: a top portion 229, a middle portion 231, and a bottom portion 233. The embodiment of FIG. 4d may be desirable because it is generally easier to use the connected shapes 227a-c as a middle layer blank than the unconnected shapes 220a-c of FIG. 4c.

In the illustrated embodiments, substantially all of the material of the sheets is split among the portions, and, thus, little or no material is wasted. Although desirable, using all of the material of the sheet is not necessary.

It is contemplated that the middle layer blanks of the present invention may be formed using methods other than those described in the above embodiments. In one non-limiting example, a portion suitable to be used as a middle layer blank may be cut from a sheet prior to detaching the sheet from a larger roll. In another example, the sheet is initially generally smooth, and corrugations or other deformities are formed onto the portions after they are cut from the sheet. Other suitable methods may also be used.

Referring back to FIG. 2a, for example, the dimensions of the inner layer blank 36, the middle layer blank 38, and the outer layer blank 40 generally depend on the desired dimensions of the resulting cup 10. The width of the blanks 36, 38, 40 may, for example, range from about 4 inches to about 24 inches. It is also contemplated, however, that the blanks 36, 38, 40 may have other widths. Because the outer layer 26 of the cup 10 has a slightly larger circumference than the middle layer 25, the outer layer blank 40 may be slightly wider than the middle layer blank 38. Similarly, because the middle layer 25 has a slightly larger circumference than the inner layer 24, the middle layer blank 38 may be slightly wider than the inner layer blank 36.

The height of each of the blanks 36, 38, 40 generally range from about 2 inches to about 10 inches. According to the illustrated embodiment of FIG. 2a, the inner layer blank 36 has a greater height (i.e., is taller) than the middle layer blank 38 and the outer layer blank 40. This may be desirable to further decrease the amount of materials used, thereby further decreasing the cost of manufacturing the resulting cup 10. In embodiments where the outer layer blank 40 and/or the middle layer blank 38 have smaller heights than the inner layer blank 36, the blanks 36, 38, 40 should be stacked such that at least the middle portion 25 is generally located on an area of the sidewall 12 that is likely to be grasped by a user. For example, the middle portion 25 may be generally centrally located relative to the height of the cup 10. It is contemplated that the blanks and corresponding layers of the cups or containers of the present invention may also have other heights relative to one another.

After each of the inner layer blank 36, the middle layer blank 38, and the outer layer blank 40 is cut and formed, the blanks 36, 38, 40 are assembled to form the sidewall 12 (FIG. 1a). To form the sidewall 12, the outer layer blank 40, the middle layer blank 38, and the inner layer blank 36 are stacked to form a flat, three-layered arrangement. The middle layer blank 38 is sandwiched between the outer layer blank 40 and the inner layer blank 36 such that a front side 246a of the outer layer blank 40 forms an outside surface 247 of the cup 10, and the back side 248b of the inner layer blank 36 forms an inside surface 250 of the cup (FIG. 1a).

The middle layer blank 38 may be glued, bonded, or otherwise fastened to the inner layer blank 36 and/or the outer layer blank 40. For example, the middle layer blank 38 may be attached to the inner layer blank 36 and the outer layer blank 40 by dabbing small amounts of adhesive (e.g., hot melt adhesive) periodically along the length of either or both sides of the middle layer blank 38. Alternatively or additionally, the small amounts of adhesive may be dabbed periodically along the length of a front side 248a of the inner layer blank 36 and/or along the back side 246b of the outer layer blank 40. Because the outer layer 26 generally has a slightly larger circumference than the middle layer 25 and the inner layer 24 (as described above), the outer layer blank 40 slides relative to the middle layer blank 38 and the inner layer blank 36 when the three-layered arrangement 44 is wrapped to form the sidewall 12. Thus, dabbing the adhesive periodically along the length of the blank(s) 36, 38, 40 fastens the blanks 36, 38, 40 such that the outer layer blank 40 may slide relative to the inner layer blank 36 to assist in preventing the resulting sidewall 12 from becoming distorted. In embodiments where the middle layer blank 38 is fastened to only one of the inner layer blank 36 or the outer layer blank 40, it may be desirable for the inner layer blank 36 to be fastened to the outer layer blank (e.g., at an end) such that each blank 36, 38, 40 is at least indirectly attached to the other blanks 36, 38, 40. The adhesive serves to maintain the blanks 36, 38, 40 in the flat, three-layered arrangement prior to assembling the cup 10 and to assist in preventing shifting of the individual blanks 36, 38, 40. The adhesive may also assist in maintaining the resulting cup 10 in an assembled state.

After the three-layered assembly is formed, it may then be wrapped to form the sidewall 12 of the cup. According to one embodiment, the three-layered arrangement is wrapped or bent around a known tapered mandrel (not shown) to form the sidewall 12, which includes the inner layer 24, the middle layer 25, and the outer layer 26. It is contemplated that other methods of wrapping the three-layered assembly may also be used. A first end of the three-layered arrangement is then sealed with a second end at a side seam area (not shown).

Referring back to FIG. 1a, in order to finish the cup 10, an upper edge 252a of the inner layer 24 is rolled radially outward to form a rim. The embodiment of FIG. 1a (or a similar embodiment), where the inner layer 24 extends past an upper edge 253a of the outer layer 26, may be desirable to facilitate the rolling process. The bottom 11 is attached to the inner layer 24, and a lower edge 252b of the inner layer 24 is folded inward and heat sealed to the bottom 11. It may be desirable for the inner layer 24 to extend past a lower edge 253b of the outer layer 26 to facilitate sealing and attaching the bottom 11. It is contemplated that various suitable methods of forming and sealing the rim and the bottom of the cup 10 may be used.

The materials, relative sizes, arrangements, and the like of the parts of the cups of the embodiments of the present invention may be varied. For example, the heights of the inner layer, the middle layer, and the outer layer of the embodiments of the present invention may vary relative to one another. Furthermore, as shown in the illustrated embodiments, the middle layer and/or the outer layer may extend substantially around the entire circumference of the cup. Alternatively, the middle layer blank and/or the outer layer blank may have a shorter length, thereby extending around less than the entire circumference of the cup. These variations may be desirable to save paper and materials without significantly affecting the insulating performance of the cup. It is also contemplated that the blanks, layers, and/or ends of the respective three-layered arrangements and/or cups of the present invention may be attached and/or sealed in any order.

According to alternative embodiment A, a thermally insulated container comprises an inner layer having a bottom portion with a bottom closure attached to the bottom portion, an outer layer wrapped around the inner layer, and an insulating middle layer sandwiched between the inner layer and the outer layer, the middle layer having at least one aperture formed therein.

According to alternative embodiment B, the container of alternative embodiment A, wherein the container is a cup.

According to alternative embodiment C, the container of alternative embodiment A, wherein the at least one aperture is at least one slit.

According to alternative embodiment D, the container of alternative embodiment A, wherein the at least one aperture is at least one hole extending completely through the sheet.

According to alternative embodiment E, the container of alternative embodiment A, wherein the middle layer includes spaced grooves formed in a surface thereof, said spaced grooves running substantially from a top edge to a bottom edge of the middle layer.

According to alternative embodiment F, the container of alternative embodiment A, further comprising a bottom blank attached to at least the inner layer to form a bottom of the container.

According to alternative embodiment G, the container of alternative embodiment A, wherein the height of the middle layer is smaller than the height of the inner layer.

According to alternative embodiment H, the container of alternative embodiment A, wherein the middle layer is formed from a sheet, the sheet being divided to form the middle layer and at least one other middle layer.

According to alternative process I, a method of making a thermally insulated container, the method comprising the acts of providing a bottom blank, an inner layer blank, and an outer layer blank, providing a sheet adapted to be used as a middle layer blank, dividing the sheet into at least a first middle layer blank and a second middle layer blank, at least one of the first middle layer blank and the second middle layer blank having an aperture formed thereon, stacking the inner layer blank, the outer layer blank, and the first middle layer blank such that the first middle layer blank is sandwiched between the inner layer blank and the outer layer blank to form a layered arrangement, wrapping the layered arrangement, and sealing opposing ends of the layered arrangement.

According to alternative process J, the method of alternative process I further comprising the acts of providing a second bottom blank, a second inner layer blank, and a second outer layer blank, stacking the second inner layer blank, the second outer layer blank, and the second middle layer blank such that the second middle layer blank is sandwiched between the second inner layer blank and the second outer layer blank to form a second layered arrangement, wrapping the second layered arrangement, and sealing opposing ends of the second layered arrangement.

According to alternative process K, the method of alternative process I, wherein the container is a cup.

According to alternative process L, the method of alternative process K, wherein the container is a cup, the method further comprising the act of rolling a top portion of at least the inner layer radially outward to form a rim.

According to alternative process M, the method of alternative process I, wherein the at least one aperture is at least one slit.

According to alternative process N, the method of alternative process I, wherein the at least one aperture is at least one hole extending completely through the sheet.

According to alternative process O, the method of alternative process I, wherein the sheet includes spaced grooves formed in a surface thereof, said spaced grooves running substantially from a top edge to a bottom edge of the sheet.

According to alternative process P, the method of alternative process I, further comprising attaching a bottom blank to at least the inner layer to form a bottom of the container.

According to alternative process Q, a method of making a thermally insulated container, the method comprising the acts of providing a sheet suitable for use as a middle layer, the sheet comprising an insulating sheet material, dividing the sheet into at least a first middle layer and a second middle layer, wherein at least one of the first middle layer and the second middle layer includes an aperture being formed therein, forming a first container, the first container including the first middle layer being sandwiched between a first inner layer and a first outer layer, and forming a second container, the second container including the second middle layer being sandwiched between a second inner layer and a second outer layer.

According to alternative process R, the method of alternative process Q, wherein the act of forming the first container further comprises stacking the first inner layer, the first outer layer, and the first middle layer such that the first middle layer is sandwiched between the first inner layer and the first outer layer to form a layered arrangement, wrapping the layered arrangement, and sealing opposing ends of the layered arrangement.

According to alternative process S, the method of alternative process Q, wherein the act of forming the second container further comprises stacking the second inner layer, the second outer layer, and the second middle layer such that the second middle layer is sandwiched between the second inner layer and the second outer layer to form a layered arrangement, wrapping the layered arrangement, and sealing opposing ends of the layered arrangement.

According to alternative process T, the method of alternative process Q, wherein the sheet is divided such that each of the first middle layer blank and the second layer blank includes more than one band.

According to alternative process U, the method of alternative process Q, wherein the sheet is generally rectangular.

While the invention is susceptible to various modifications and alternative forms, specific embodiments and methods thereof have been shown by way of example in the drawings and are described in detail herein. It should be understood, however, that it is not intended to limit the invention to the particular forms or methods disclosed, but, to the contrary, the intention is to cover all modifications, equivalents and alternatives falling within the spirit and scope of the invention.

What is claimed is:

1. A method of making a thermally insulated container, the method comprising the acts of:
   providing a bottom blank, an inner layer blank, and an outer layer blank;
   providing a sheet adapted to be used as a middle layer blank;
   dividing the sheet into at least a first middle layer blank and a second middle layer blank, at least one of the first middle layer blank and the second middle layer blank having an aperture formed thereon;
   stacking the inner layer blank, the outer layer blank, and the first middle layer blank such that the first middle layer blank is sandwiched between the inner layer blank and the outer layer blank to form a layered arrangement;

wrapping the layered arrangement; and sealing opposing ends of the layered arrangement.

2. The method of claim 1 further comprising the acts of:

providing a second bottom blank, a second inner layer blank, and a second outer layer blank;

stacking the second inner layer blank, the second outer layer blank, and the second middle layer blank such that the second middle layer blank is sandwiched between the second inner layer blank and the second outer layer blank to form a second layered arrangement;

wrapping the second layered arrangement; and sealing opposing ends of the second layered arrangement.

3. The method of claim 1, wherein the container is a cup.

4. The method of claim 3, further comprising the act of rolling a top portion of at least the inner layer radially outward to form a rim.

5. The method of claim 1, wherein the at least one aperture is at least one slit.

6. The method of claim 1, wherein the at least one aperture is at least one hole extending completely through the sheet.

7. The method of claim 1, wherein the sheet includes spaced grooves formed in a surface thereof, said spaced grooves running substantially from a top edge to a bottom edge of the sheet.

8. The method of claim 1, further comprising attaching a bottom blank to at least the inner layer to form a bottom of the container.

9. A method of making a thermally insulated container, the method comprising the acts of:

providing a sheet suitable for use as a middle layer, the sheet comprising an insulating sheet material;

dividing the sheet into at least a first middle layer and a second middle layer, wherein at least one of the first middle layer and the second middle layer includes an aperture being formed therein;

forming a first container, the first container including the first middle layer being sandwiched between a first inner layer and a first outer layer; and forming a second container, the second container including the second middle layer being sandwiched between a second inner layer and a second outer layer.

10. The method of claim 9, wherein the act of forming the first container further comprises:

stacking the first inner layer, the first outer layer, and the first middle layer such that the first middle layer is sandwiched between the first inner layer and the first outer layer to form a layered arrangement;

wrapping the layered arrangement; and sealing opposing ends of the layered arrangement.

11. The method of claim 9, wherein the act of forming the second container further comprises:

stacking the second inner layer, the second outer layer, and the second middle layer such that the second middle layer is sandwiched between the second inner layer and the second outer layer to form a layered arrangement;

wrapping the layered arrangement; and sealing opposing ends of the layered arrangement.

12. The method of claim 9, wherein the sheet is divided such that each of the first middle layer blank and the second layer blank includes more than one band.

13. The method of claim 9, wherein the sheet is generally rectangular.

* * * * *

UNITED STATES PATENT AND TRADEMARK OFFICE
CERTIFICATE OF CORRECTION

| | | |
|---|---|---|
| PATENT NO. | : 8,708,880 B2 | Page 1 of 1 |
| APPLICATION NO. | : 11/985102 | |
| DATED | : April 29, 2014 | |
| INVENTOR(S) | : Wiedmeyer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1538 days.

Signed and Sealed this
Eighth Day of September, 2015

Michelle K. Lee
*Director of the United States Patent and Trademark Office*